(12) United States Patent
Zhang et al.

(10) Patent No.: US 12,439,590 B2
(45) Date of Patent: Oct. 7, 2025

(54) MEMORY DEVICE

(71) Applicants: Guobiao Zhang, Corvallis, OR (US); Zhitang Song, ShangHai (CN)

(72) Inventors: Guobiao Zhang, Corvallis, OR (US); Zhitang Song, ShangHai (CN)

(73) Assignee: Southern University of Science and Technology, GuangDong (CN)

( * ) Notice: Subject to any disclaimer, the term of this patent is extended or adjusted under 35 U.S.C. 154(b) by 604 days.

(21) Appl. No.: 17/881,597

(22) Filed: Aug. 4, 2022

(65) Prior Publication Data

US 2023/0044721 A1 Feb. 9, 2023

(30) Foreign Application Priority Data

| Aug. 6, 2021 | (CN) | ......................... | 202110903910.0 |
| Dec. 29, 2021 | (CN) | ......................... | 202111641964.0 |
| Jun. 17, 2022 | (CN) | ......................... | 202210691159.7 |
| Jul. 22, 2022 | (CN) | ......................... | 202210871271.9 |

(51) Int. Cl.
   *H10B 20/25* (2023.01)

(52) U.S. Cl.
   CPC .................................. *H10B 20/25* (2023.02)

(58) Field of Classification Search
   CPC ...... H10B 20/25; H10B 63/84; H10B 63/845; H10B 99/10; H10N 70/20; H10N 70/826; H10N 70/8825; H10N 70/8828; H01L 23/5252
   USPC ................................................. 365/148, 158
   See application file for complete search history.

(56) References Cited

U.S. PATENT DOCUMENTS

| 5,095,362 A   | * | 3/1992 | Roesner  | H01L 23/5252 |
|               |   |        |          | 257/334      |
| 8,223,580 B2  | * | 7/2012 | Parkinson | G11C 8/10   |
|               |   |        |          | 365/163      |
| 10,707,417 B1 | * | 7/2020 | Bruce    | H10N 70/066  |
| 2008/0112217 A1 | * | 5/2008 | Karpov | G11C 13/0004 |
|               |   |        |          | 365/163      |
| 2008/0212363 A1 | * | 9/2008 | Fuji   | G11C 13/0069 |
|               |   |        |          | 365/163      |
| 2011/0215436 A1 | * | 9/2011 | Tang   | H10D 8/00    |
|               |   |        |          | 438/479      |
| 2016/0078933 A1 | * | 3/2016 | Peng   | G11C 17/18   |
|               |   |        |          | 365/148      |
| 2017/0213761 A1 | * | 7/2017 | Tang   | H01L 21/32   |

(Continued)

FOREIGN PATENT DOCUMENTS

| CN | 103489478 | A | * | 1/2014 |
| CN | 107316869 | A | * | 11/2017 |
| TW | 1506649 | B | * | 11/2015 |

*Primary Examiner* — Michael T Tran

(57) ABSTRACT

A cross-point memory includes a plurality of memory devices, with each device comprising a memory layer between first and second address lines. In one preferred embodiment, the memory layer comprises an OTS (Ovonic Threshold Switch) film and an antifuse film. In another preferred embodiment, the memory layer comprises an OTS film having a first switch voltage (i.e. forming voltage $V_{form}$) greater than all subsequent switch voltages (i.e. threshold voltage $V_{th}$). The cross-point memory is preferably a three-dimensional one-time-programmable memory (3D-OTP), including horizontal 3D-OTP and vertical 3D-OTP.

11 Claims, 10 Drawing Sheets

(56) References Cited

U.S. PATENT DOCUMENTS

| | | | |
|---|---|---|---|
| 2018/0019391 A1* | 1/2018 | Ohba | H10N 97/00 |
| 2018/0102371 A1* | 4/2018 | Shiimoto | H10B 20/25 |
| 2020/0052036 A1* | 2/2020 | Ikarashi | H10N 70/882 |
| 2021/0111342 A1* | 4/2021 | Liu | G11C 13/0004 |
| 2021/0288251 A1* | 9/2021 | Cheng | H10N 70/231 |
| 2022/0069207 A1 | 3/2022 | McCrate et al. | |

* cited by examiner

Table 1 compares the performance of various OTS materials.

| | Te-based | | | Se-based | | S-based | O-based |
|---|---|---|---|---|---|---|---|
| | C-Te | Si-Te | B-Te | GeSeSbN | GeSeAs | Ge-S | Hf-O |
| $J_{on}$ (MA/cm$^2$) | 10 | 10 | 50 | 1 | 10 | 30 | 10 |
| Selectivity ($S=I_{ON}/I_{OFF}$) | $10^5$ | $10^6$ | $10^5$ | $10^7$ | $10^5$ | $10^6$ | $10^7$ |

MEMORY DEVICE

CROSS-REFERENCE TO RELATED APPLICATIONS

This application claims priorities from Chinese Patent Application No. 202110903910.0, filed Aug. 6, 2021; Chinese Patent Application No. 202111641964.0, filed Dec. 29, 2021; Chinese Patent Application No. 202210691159.7, filed Jun. 17, 2022; Chinese Patent Application No. 202210871271.9, filed Jul. 22, 2022, in the State Intellectual Property Office of the People's Republic of China (CN), the disclosure of which is incorporated herein by references in their entireties.

BACKGROUND

1. Technical Field of the Invention

The present invention relates to the field of semiconductor memory, and more particularly to cross-point memory.

2. Prior Art

Cross-point memory has a small device area ($4F^2$) and can easily realize three-dimensional (3-D) stacking. As illustrated in FIG. 1, a memory device 00 comprises a first address line 01, a second address line 02, and a memory layer 06 there-between. As used hereinafter, a memory layer 06 includes all films (or, sub-layers) between the first address line 01 and the second address line 02. The memory layer 06 generally comprises a selector film 03 and a programmable film 04. The selector film 03 functions as a switch and prevents cross-talk between adjacent memory devices during read/write. It has two volatile states, i.e. a low-resistance state (e.g. "ON" state) and a high-resistance state (e.g. "OFF" state). On the other hand, the programmable film 04 functions as information storage and stores digital data. It stores at least two non-volatile states, i.e. a low-resistance state (e.g. "1" state) and a high-resistance state (e.g. "0" state). Hereinafter, "volatile" means that a low-resistance state returns to a high-resistance state when power is off (at this time, a high-resistance state remains at a high-resistance state); "non-volatile" means that the low-resistance state and the high-resistance state remain at their respective states when power is off.

In the memory layer 06, the selector film 03 and the programmable film 04 are active films. As the core functional films of the memory device 00, they play vital roles of switching and storage, respectively. Besides these films, the memory layer 03 may further comprise a barrier film, such as an intermediate-barrier film 30C between the selector film 03 and the programmable film 04; or, an interface-barrier film 30D between the active film and the address line. The barrier film only plays a role of isolation, i.e. to prevent reaction between the selector film and the programmable film, or between the active film and the address line, during read/write when the temperatures at the selector film 03 and the programmable film 04 rise due to a large current density.

In the memory device 00, the width of the address lines 01, 02 is F, which is the critical feature size. On the other hand, the total thickness T of the memory layer 06 is the distance between the top surface 01P of the first (or, lower) address line 01 and the bottom surface 02P of the second (or, upper) address line 02. In the case of having no barrier film, $T=T_s+T_m$, where $T_s$ is the thickness of selector film 03, and $T_m$ is the thickness of programmable film 04. In the case of having at least a barrier layer, the thickness of the barrier layer(s) has to be added to the total thickness T. In general, $T_s$ and $T_m$ do not scale with F. When F is scaled to an advanced node (e.g. 10 nm), the aspect ratio (AR, which is the ratio of thickness and line-width) of the memory layer 06 becomes large, resulting in manufacturing complexity.

This manufacturing complexity has been shown in the cross-point products. Existing cross-point memory products include: (1) 3-D OTP produced by Matrix Semiconductor (FIG. 2A); (2) 3D-XPoint produced by Intel (FIG. 2B). Both products face a "large AR" challenge.

FIG. 2A is a cross-sectional view of a 3-D OTP device 00. Its memory layer 06 comprises a selector film 03 and a programmable film 04. The selector film 03 is a P/i/N diode. During read/write, a large number of diodes are reversely biased. To circumvent a large leakage current, the diodes preferably have a large reverse breakdown voltage. This means that the diode thickness (more particularly, the thickness of i-layer) $T_s$ has to be large, i.e. $T_s \sim 300$ nm. On the other hand, the programmable film 04 is an antifuse. In general, the antifuse thickness $T_m$ is small, e.g. $T_m \sim 10$ nm; Since $T_m \ll T_s$, T is mainly determined by $T_s$. In FIG. 2A, the memory device 00 has a critical feature size F of 130 nm, and therefore an AR value of 2.3:1. This AR value is acceptable in manufacturing. However, because $T_s$ does not scale with F, this causes the AR value too large when F is scaled to an advanced node. For example, when F is scaled to 10 m, AR will reach 30:1. This is difficult to realize in manufacturing.

FIG. 2B is a cross-sectional view of a 3D-XPoint device 00. Its memory layer 06 also comprises a selector film 03 and a programmable film 04. The selector film 03 is an OTS (Ovonic Threshold Switch) film. This OTS film 03 exhibits an Ovshinsky effect, i.e. it switches from a non-conductive state to a conductive state (or, vice versa) under an electric field. On the other hand, the programmable film 04 is a phase change material (PCM). This PCM film 04 can be converted between a crystalline state (i.e. a low-resistance state) and an amorphous state (i.e. a high-resistance state). In FIG. 2B, the thickness $T_s$ of the OTS film 03 (including the surrounding barrier material) is ~50 nm, while the thickness $T_m$ of the PCM film 04 (including the surrounding barrier material) is ~70 nm. Thus, the total thickness T of the memory layer 06 is ~120 nm. Considering the critical feature size F of the memory device is 20 nm, the AR value of the memory layer 06 is 6:1. This AR value is acceptable in the current manufacturing. However, the room for further scaling is limited. For example, when F is scaled to 10 nm, the AR value will become 12:1. It is quite challenging to realize such a large AR.

For 3D-XPoint, although the selector film 03 (using an OTS film, ~50 nm) is thinner than that of 3-D OTP (using a diode film, ~300 nm), its memory layer still has a large AR value, because the programmable film 04 (using a PCM film, ~70 nm) is thicker than that of the 3-D OTP (using an antifuse film, ~10 nm). How to reduce the total thickness T of the memory layer 06 is of great significance to scaling and manufacturability of the cross-point memory.

Objects and Advantages

It is a principle object of the present invention to provide a memory layer with an ultra-thin memory layer and a small aspect ratio (AR) value.

It is a further object of the present invention to provide a memory with a simple device structure.

It is a further object of the present invention to provide a memory with improved scalability and manufacturability.

In accordance with these and other objects of the present invention, the present invention discloses a memory device. In one preferred embodiment, the memory layer comprises an OTS (Ovonic Threshold Switch) film and an antifuse film. In another preferred embodiment, the memory layer comprises an OTS film having a first switch voltage (i.e. forming voltage $V_{form}$) greater than all subsequent switch voltages (i.e. threshold voltage $V_th$).

SUMMARY OF THE INVENTION

The present invention discloses a cross-point memory which combines the strengths of both 3-D OTP (FIG. 2A) and 3D-XPoint (FIG. 2B). In order to lower the AR value of the memory layer, the memory device of this preferred cross-point memory chooses the OTS film of 3D-XPoint as its selector film and the antifuse film of 3-D OTP as its programmable film. This results in the total thickness T of the memory layer smaller than or equal to 60 nm. Even when F is scaled to 10 nm, the AR value of the memory layer is 6:1, which is acceptable. Using an antifuse film, this preferred cross-point memory is preferably a one-time-programmable memory (OTP). Note that the memory layer of the OTP device does not comprise any PCM film.

Accordingly, the present invention discloses a memory including a plurality of memory devices, each of said devices comprising: first and second address lines intersecting each other; a memory layer between said first and second address lines, comprising an OTS film and an antifuse film.

In order to simplify device structure, improve scalability and manufacturability, the present invention further discloses a single-film memory device. Its memory layer only comprises a single active film, which performs both writing and switching. The single-film memory device takes advantage of the forming (or, firing) characteristic of the OTS film. As illustrated in FIG. 5, typical OTS films show a forming characteristic: during a first forward voltage scan, the OTS film shows a first switch-on I-V curve (0→1→2) and switches on at a first switch voltage; during a subsequent forward voltage scan (e.g. a second scan, a third scan . . . ), the OTS film shows a second switch-on I-V curve (6→7→8) and switches on at a subsequent switch voltage. Because the first switch voltage is generally greater than all subsequent switch voltages, the first forward voltage scan is referred to as forming (or, firing). Accordingly, the first switch voltage is referred to as forming voltage $V_{form}$; the subsequent switch voltage is referred to as threshold voltage $V_{th}$; and note that $V_{form} > V_{th}$. On the other hand, the I-V curves for all reverse voltage scans (3→4→5) are similar and their switch (switch-off) voltages are the holding voltage Vhold.

Forming is considered troublesome in 3D-XPoint, because it requires all memory devices to go through an initialization step before usage (to make sure all memory devices have similar switching characteristics). Due to the large number of memory devices (e.g. 128 Gb for 3D-XPoint), this initialization step takes a long time. It is naturally desired to develop an OTS film that does not require forming. Some of these efforts can be found in, e.g. Hennen et al., "Forming-Free Mott Oxide Threshold Selector Nano-Device Showing S-type NDR with Endurance (>10^12 Cycles), Excellent $V_{th}$ Stability (<5%), Fast (<10 ns) Switching, and Promising Scaling Properties", in 2018 International Electron Device Meeting (IEDM) Technical Digest, pp. 867-870.

The single-film memory device is not troubled by forming. Instead, it takes advantage of forming. It use forming (with a larger switch voltage) to realize a write operation; and, use subsequent switch (with a smaller switch voltages) to realize read operations. In effect, it realizes an OTP device, whose OTS film not only functions as a selector film, but also as a programmable film. The biggest advantage of the single-film memory device is that it only comprises a single active film. Namely, it has 1S structure (S—selector). In comparison, 3D-XPoint is a double-film memory device, with a 1S1R structure (S—selector; R—programmable resistor). Apparently, the single-film memory device has a thinner memory layer, a smaller AR value, a simpler device structure, better scalability and manufacturability.

Accordingly, the present invention further discloses a memory including a plurality of memory devices, each of said devices comprising first and second address lines intersecting each other; a memory layer between said first and second address lines, comprising an OTS film having a first switch voltage (forming voltage $V_{form}$) greater than all subsequent switch voltages (threshold voltage $V_{th}$).

The memory devices disclosed by the present invention can be vertically stacked to form a three-dimensional one-time-programmable memory (3D-OTP). The 3D-OTP could be horizontal 3D-OTP (FIG. 8) or vertical 3D-OTP (FIG. 10). In the horizontal 3D-OTP, all address lines are horizontal. Preferably, the width of these address lines is smaller than or equal to 60 nm. To achieve a small AR value, the total thickness of the memory layer T is preferably smaller than or equal to 60 nm. In the vertical 3D-OTP, at least one set of the address lines is vertical. Its memory device also comprises a memory hole penetrating the first address line, wherein the memory layer is formed on the side wall of said memory hole; and, the second address line is disposed in the memory hole and surrounded by the memory layer (FIG. 9). In order to achieve a large storage density, the size of the memory hole needs to be small. Namely, the total thickness of the memory layer T is preferably smaller than or equal to 60 nm in the vertical 3D-OTP.

Accordingly, the present invention further discloses a three-dimensional memory, comprising a semiconductor substrate; a plurality of first and second address lines above said semiconductor substrate, wherein said first and second address lines intersect each other; and, a plurality of one-time-programmable memory (OTP) devices disposed at the intersections between said first and second address lines; each of said devices comprising a memory layer between said first and second address lines, wherein said memory layer comprises at least an OTS film, and the total thickness of said memory layer is smaller than or equal to 60 nm.

Figure 1:
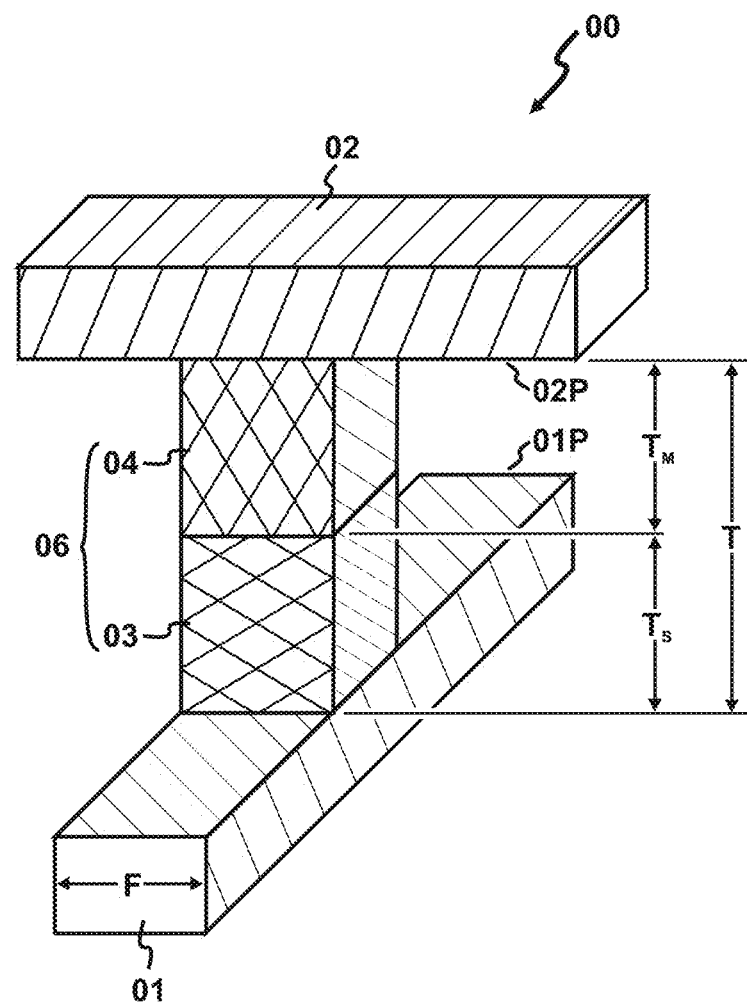
FIG. 1 is a perspective view of a cross-point memory device (prior art).

It should be noted that all the drawings are schematic and not drawn to scale. Relative dimensions and proportions of parts of the device structures in the figure have been shown exaggerated or reduced in size for the sake of clarity and convenience in the drawings. The same reference symbols are generally used to refer to corresponding or similar features in the different embodiments. The symbol "I" means a relationship of "and" or "or".

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Figure 2A:
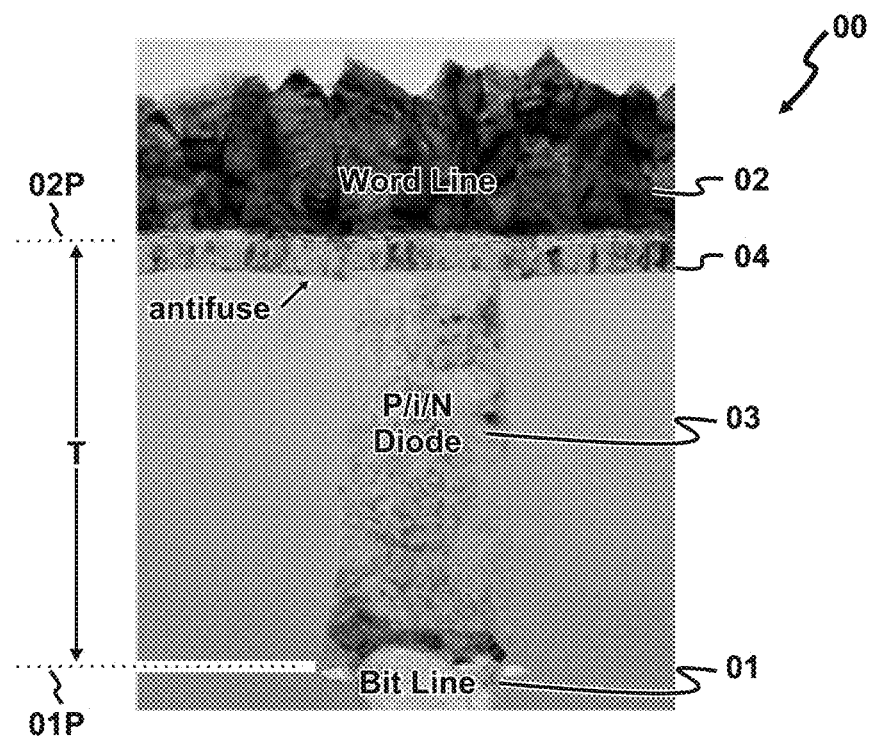
FIG. 2A is a cross-sectional view of 3-D OTP produced by Matrix Semiconductor (prior art)
Figure 2B:
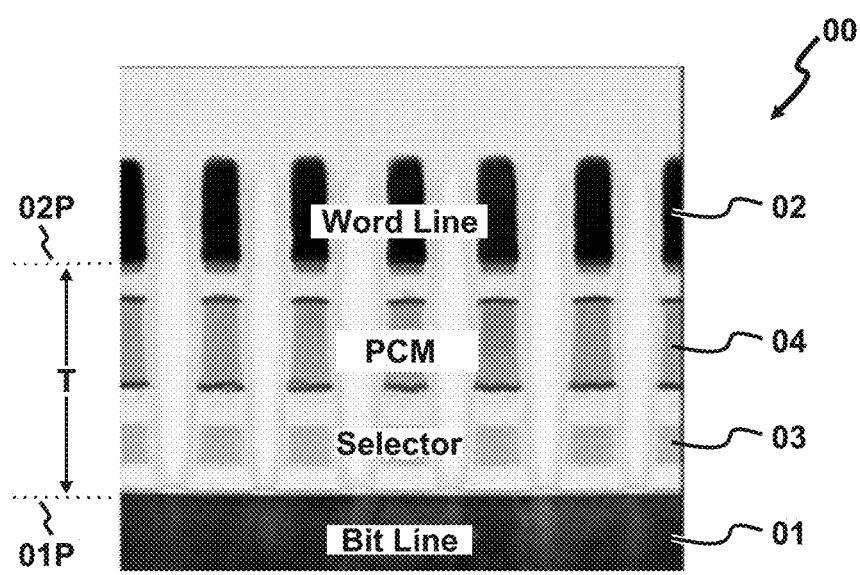
FIG. 2B is a cross-sectional view of 3D-XPoint produced by Intel (prior art).

The present invention discloses a cross-point memory which combines the strengths of both 3-D OTP (FIG. 2A) and 3D-XPoint (FIG. 2B). In order to lower the aspect ratio (AR) of the memory layer, the memory device of this preferred cross-point memory chooses the OTS film of 3D-XPoint as its selector film and the antifuse film of 3-D OTP as its programmable film. This results in the total thickness T of the memory layer smaller than or equal to 60 nm. Even when F is scaled to 10 nm, the AR value of the memory layer is 6:1, which is acceptable. Using an antifuse film, this preferred cross-point memory is preferably a one-time-programmable memory (OTP). Note that the memory layer of the OTP device does not comprise any PCM film.

Figure 3A:
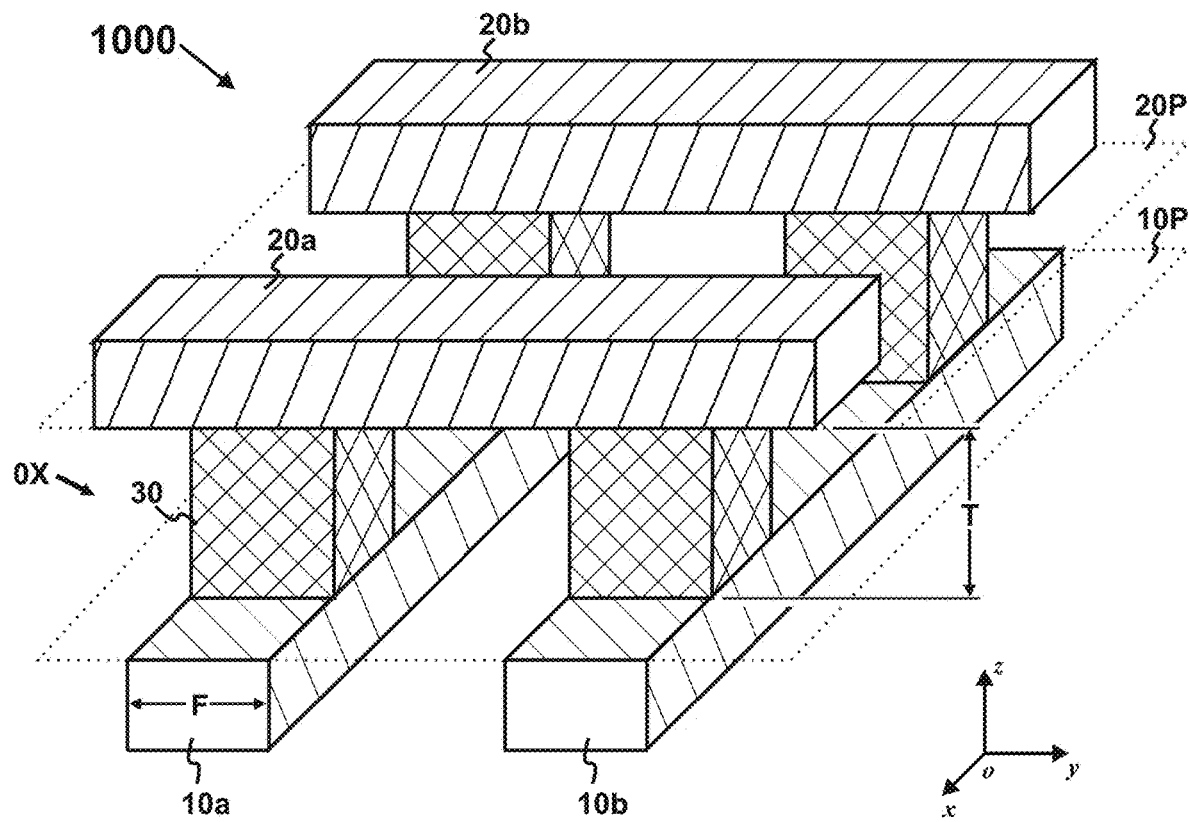
FIG. 3A is a perspective view of a preferred cross-point memory.

FIG. 3A shows a cross-point memory 1000. It includes first address lines 10a, 10b, second address lines 20a, 20b. The first address lines 10a, 10b are disposed on a first plane, whose upper surface forms a first surface 10P; The second address lines 20a, 20b are disposed on a second plane, whose lower surface forms a second surface 20P. The memory layer 30 is interposed between the first and second surfaces 10P, 20P; and coupled with the first and second address lines 10a, 10b; 20a, 20b.

Figure 3B:
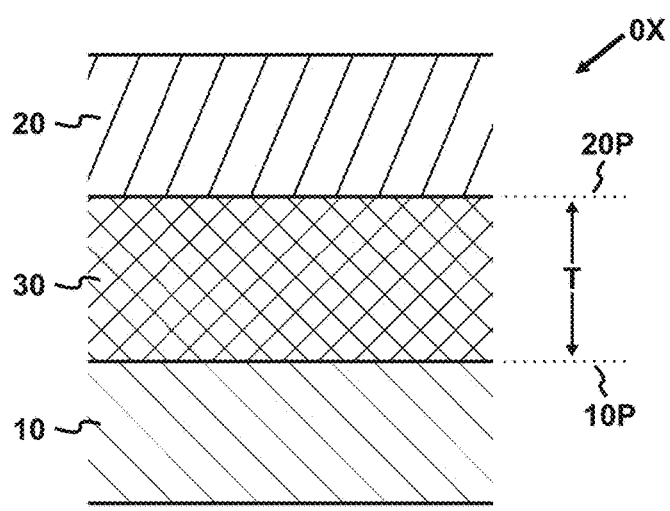
FIG. 3B is a cross-sectional view of a memory device.
Figure 7:
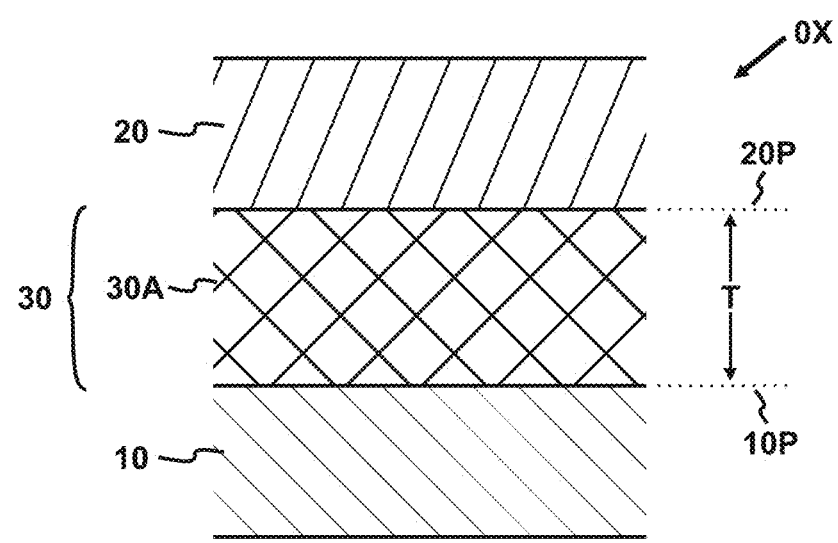
FIG. 7 is a cross-sectional view of a single-film memory device.

FIG. 3B shows a memory device OX of the preferred cross-point memory 1000. It comprises a top electrode (which is a portion of the second address line 20), a bottom electrode (which is a portion of the first address line 10), and a memory layer 30 there-between. The memory layer 30 comprises at least an OTS film. In one preferred embodiment, the memory layer 30 comprises an OTS film and an antifuse film (FIGS. 4A-4D). In another preferred embodiment, the memory layer 30 comprises an OTS film having a first switch voltage (i.e. forming voltage $V_{form}$) greater than all subsequent switch voltages (i.e. threshold voltage $V_{th}$) (FIGS. 5-7). The total thickness T of the memory layer 30 is smaller than or equal to 60 nm and therefore, the AR value of the memory device disclosed in the present invention is acceptable in manufacturing.

FIGS. 4A-4D show four preferred memory devices OX. Each of their memory layers 30 comprises an OTS film 30A and antifuse film 30B. The antifuse film 30B is a thin layer of an insulating dielectric (such as silicon dioxide). It is in a high-resistance state before programming. Under a programmed voltage, the antifuse film breaks down and is irreversibly converted into a low-resistance state.

Figure 4A:
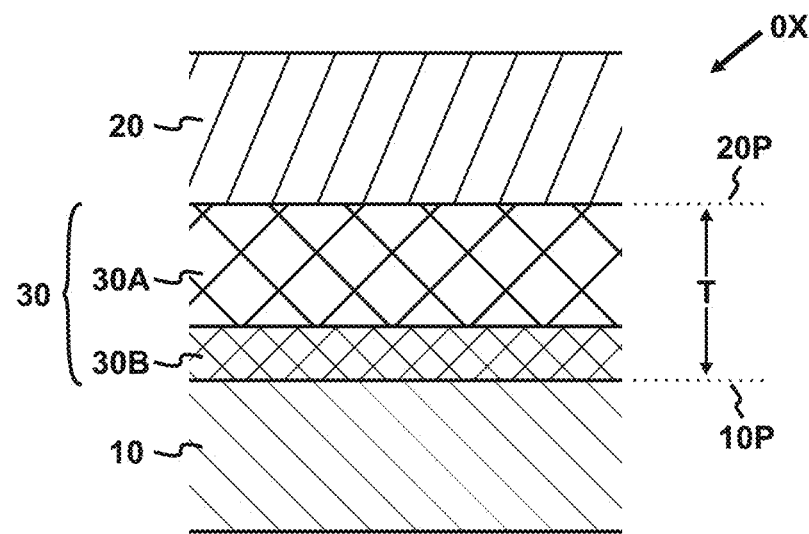
FIGS. 4A-4D are cross-sectional views of four memory devices.
Figure 4B:
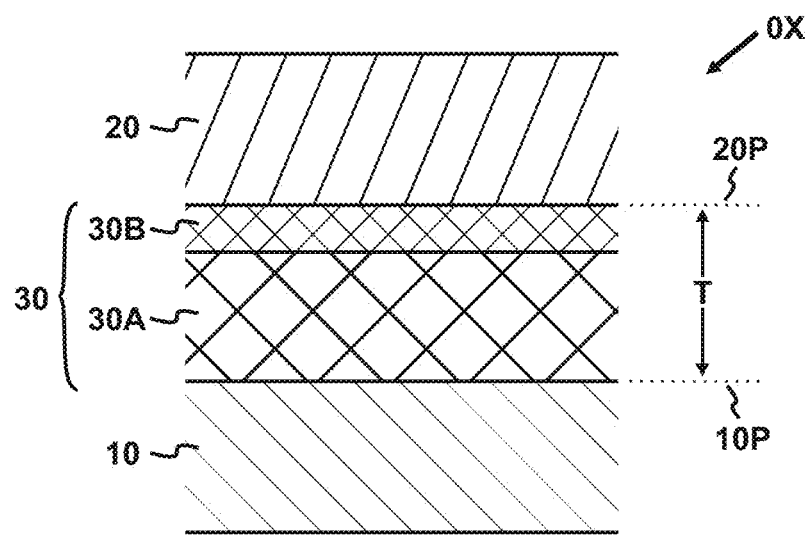
Figures 5, 6:
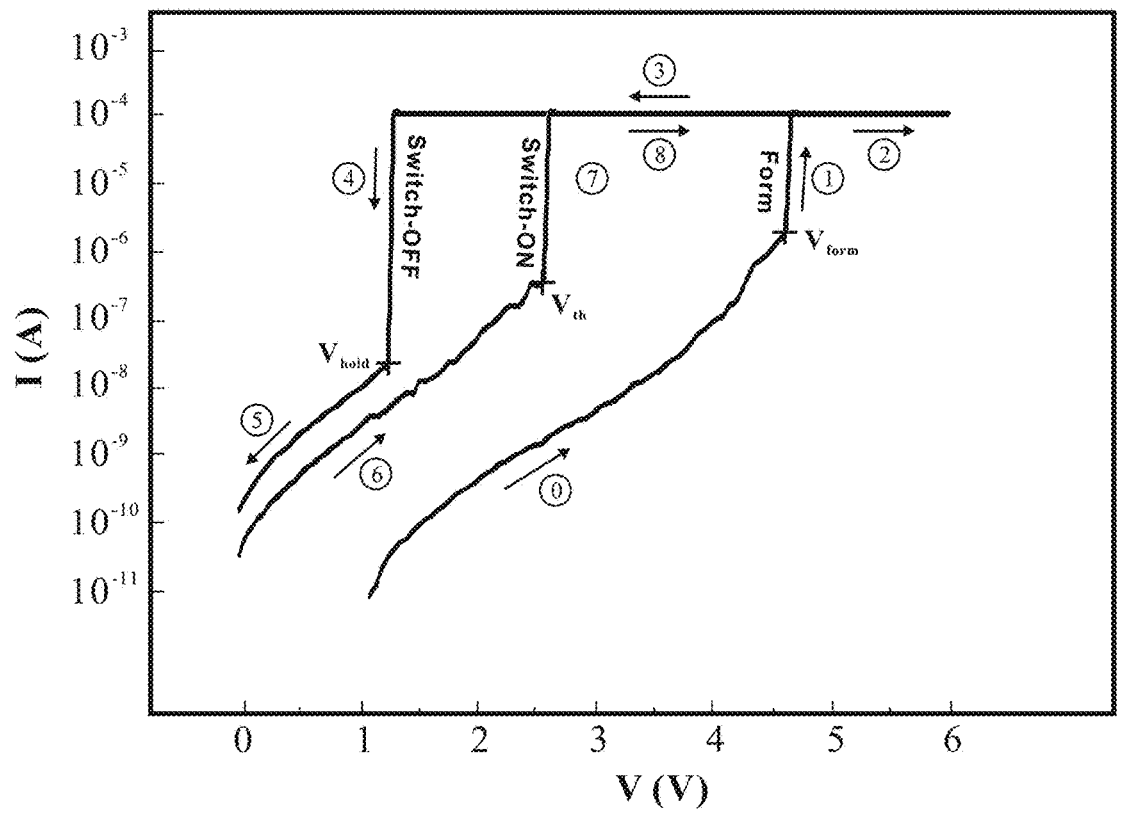
FIG. 5 is the I-V curve of a typical OTS film.
FIG. 6 (Table 1) compares the performance of various OTS materials.

In FIG. 4A, the antifuse film 30B can be formed by being deposited (using methods such as by CVD or ALD) on the first address line 10, or directly oxidizing or nitridizing the first address line 10. In FIG. 4B, the antifuse film 30B can be formed by being deposited (using methods such as by CVD or ALD) on the OTS film 30A, or directly oxidizing or nitridizing the OTS film 30A.

Figure 4C:
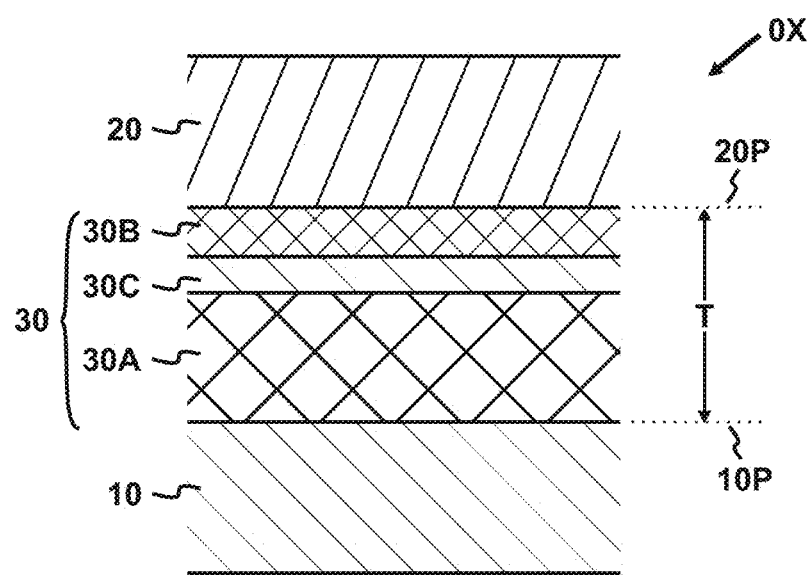
Figure 4D:
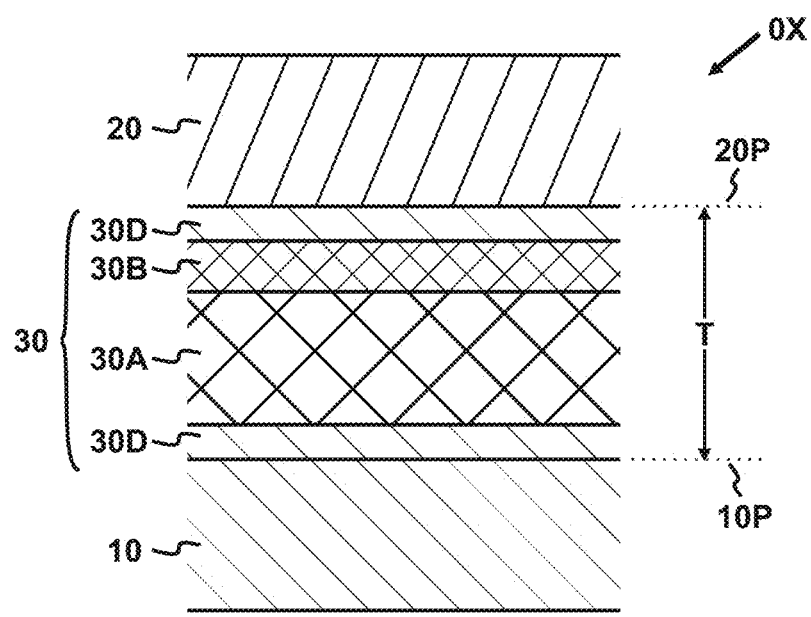

In FIGS. 4C-4D, the memory layer 30 further comprises a barrier film, such as an intermediate-barrier film 30C between the OTS film 30A and the antifuse film 30B (FIG. 4C); or, an interface-barrier film 30D between the active film and the address line (FIG. 4D). The barrier film only plays a role of isolation, i.e. to prevent reaction between the OTS film 30A and the antifuse film 30B, or between the active film and the address line, during read/write when the temperatures at the OTS film 30A and the antifuse film 30B rise due to a large current density.

In FIG. 4C, an intermediate-barrier film 30C is disposed between the OTS film 30A and the antifuse film 30B. It comprises a conductive material and can be used to prevent reaction between the OTS film 30A and the antifuse film 30B during read/write. It should be apparent to those skilled in the art that the antifuse film 30B can also be formed by directly oxidizing or nitridizing the intermediate-barrier film 30C.

In FIG. 4D, an interface-barrier film 30D is disposed between the active film (e.g. the OTS film 30A and/or antifuse film 30B) and the address line (e.g. 10/20). It comprises another conductive material (e.g. carbon) and can be used to improve the interface properties. Note that even with the addition of the barrier films (e.g. 30C and 30D), the total thickness T of the memory layer 30 should still be smaller than or equal to 60 nm.

In order to simplify device structure, improve scalability and manufacturability, the present invention further discloses a single-film memory device. Its memory layer only comprises a single active film, which performs both writing and switching. The single-film memory device takes advantage of the forming (or, firing) characteristic of the OTS film. As illustrated in FIG. 5, typical OTS films show a forming characteristic: during a first forward voltage scan, the OTS film shows a first switch-on I-V curve (0→1→2) and switches on at a first switch voltage; during a subsequent forward voltage scan (e.g. a second scan, a third scan . . . ), the OTS film shows a second switch-on I-V curve (6→7→8) and switches on at a subsequent switch voltage. Because the first switch voltage is generally greater than all subsequent switch voltages, the first forward voltage scan is referred to as forming (or, firing). Accordingly, the first switch voltage is referred to as forming voltage $V_{form}$; the subsequent switch voltage is referred to as threshold voltage $V_{th}$; and note that $V_{form} > V_{th}$. On the other hand, the I-V curves for all reverse voltage scans (3→4→5) are similar and their switch (switch-off) voltages are the holding voltage Vhold.

Forming is considered troublesome in 3D-XPoint, because it requires all memory devices to go through an initialization step before usage (to make sure all memory devices have similar switching characteristics). Due to the large number of memory devices (e.g. 128 Gb for 3D-XPoint), this initialization step takes a long time. It is naturally desired to develop an OTS film that does not require forming. Some of these efforts can be found in, e.g. Hennen et al., "Forming-Free Mott Oxide Threshold Selector Nano-Device Showing S-type NDR with Endurance (>10^12 Cycles), Excellent $V_{th}$ Stability (<5%), Fast (<10 ns) Switching, and Promising Scaling Properties", in 2018 International Electron Device Meeting (IEDM) Technical Digest, pp. 867-870.

The single-film memory device is not troubled by forming. Instead, it takes advantage of forming. It use forming (with a larger switch voltage) to realize a write operation; and, use subsequent switch (with a smaller switch voltages) to realize read operations. In effect, it realizes an OTP device, whose OTS film not only functions as a selector film, but also as a programmable film. The biggest advantage of the single-film memory device is that it only comprises a single active film. Namely, it has 1S structure (S—selector). In comparison, 3D-XPoint is a double-film memory device, with a 1S1R structure (S—selector; R—programmable resistor). Apparently, the single-film memory device has a thinner memory layer, a smaller AR value, a simpler device structure, better scalability and manufacturability.

FIG. 6 (Table 1) compares the performance of various OTS materials. An OTS material generally comprises chalcogen (Group VI a) elements, such as Te (to form a telluride), Se (to form a selenide), S (to form a sulfide) and O (to form an oxide). A typical OTS material is chalcogenide glass. Examples include TiN (top electrode)/AsTeGeSiN (OTS film)/TiN (bottom electrode) (Kim et al, VLSI 2013, pp. T240-1). In addition, single-element OTS film (which primarily comprises a single element, e.g. single-element tellurium, or Te) (Shen et al, Science 374, pp. 1390-4, 2021) also shows good characteristics. The manufacturing process of the single-element OTS film is simpler and easier. For the single-element OTS film 30A, the mole ratio of the single element preferably exceeds 80%.

For the single-film memory device OX, an interface-barrier film 30D may also be disposed between the OTS film 30A and the address line 10/20 (similar to FIG. 4D). As one preferred embodiment, the interface-barrier film 30D is disposed between the OTS film 30A and one address line (e.g. 10). As another preferred embodiment, the interface-barrier film 30D is disposed between the OTS film 30A and both address lines 10, 20. In order to maintain a small AR value, the total thickness T of the memory layer 30 (including all barrier films 30D) of the preferred single-film memory device is smaller than or equal to 60 nm.

Figure 9:
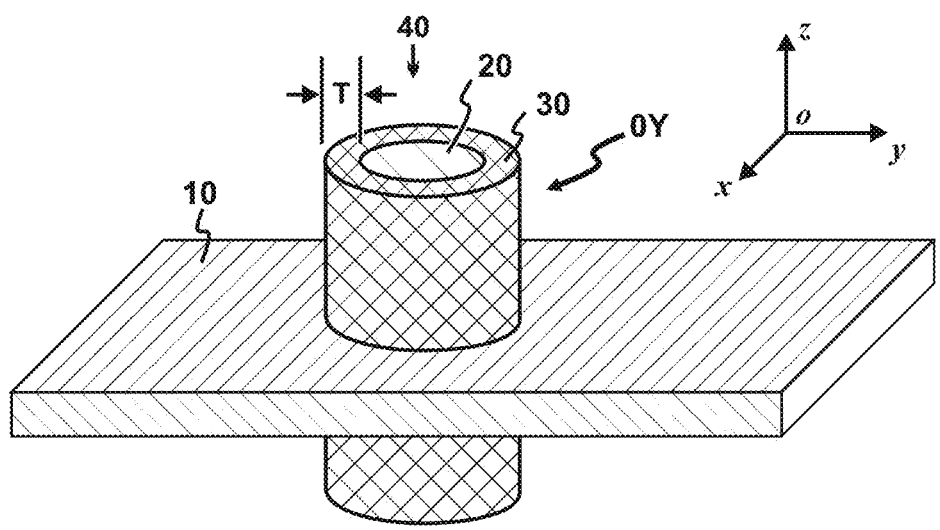
FIG. 9 is a perspective view of a vertical OTP device.
Figure 10:
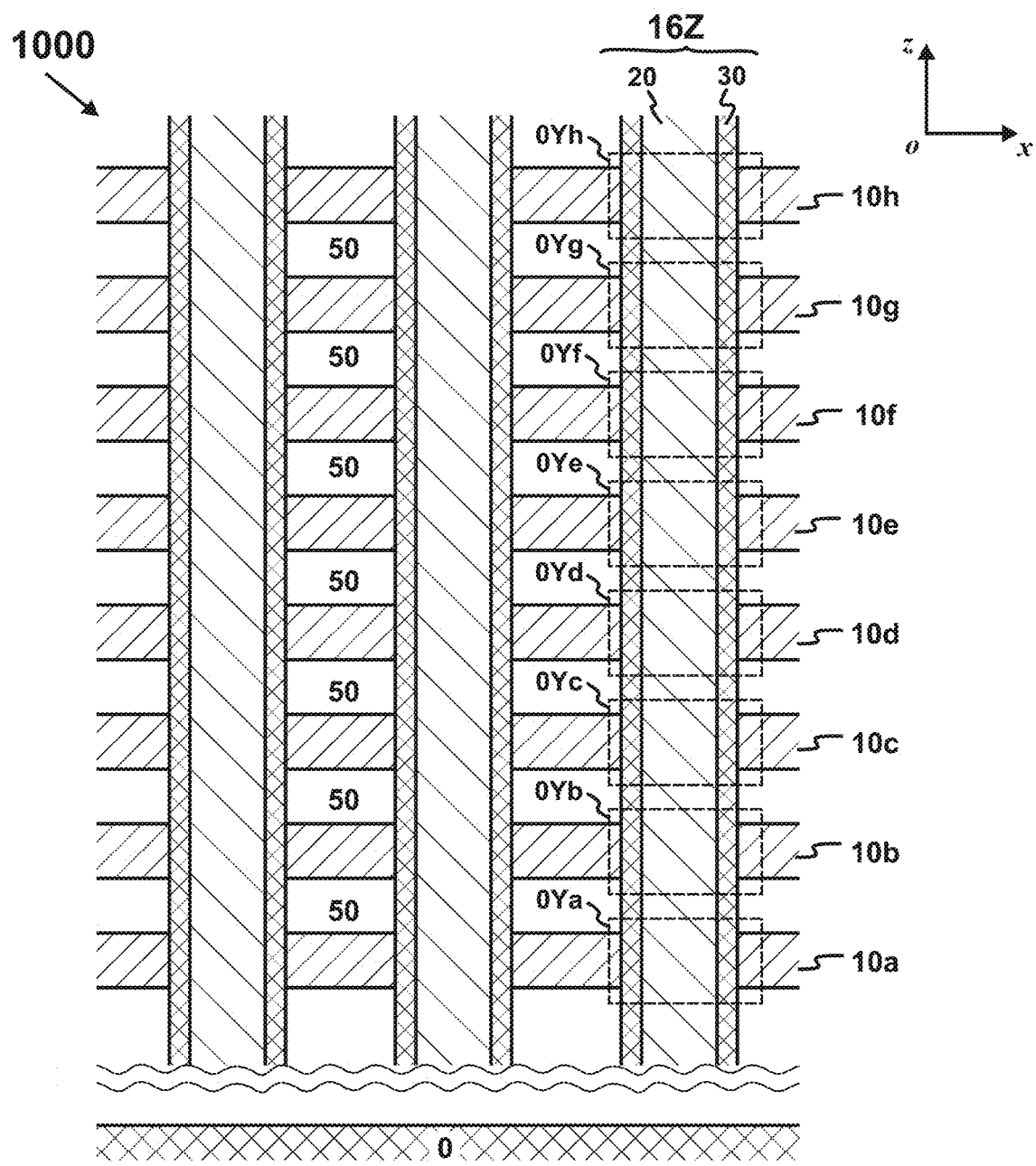
FIG. 10 is a cross-sectional view of a vertical 3D-OTP.

The memory devices disclosed by the present invention can be vertically stacked to form a three-dimensional one-time-programmable memory (3D-OTP). The 3D-OTP could be horizontal 3D-OTP (FIG. 8) or vertical 3D-OTP (FIG. 10). In the horizontal 3D-OTP, all address lines are horizontal. Preferably, the width of these address lines should be smaller than or equal to 60 nm. To achieve a small AR value, the total thickness of the memory layer T is preferably smaller than or equal to 60 nm. In the vertical 3D-OTP, at least one set of the address lines is vertical. Its memory device also comprises a memory hole penetrating the first address line, wherein the memory layer is formed on the side wall of said memory hole; and, the second address line is disposed in the memory hole and surrounded by the memory layer (FIG. 9). In order to achieve a large storage density, the size of the memory hole needs to be small. Accordingly, the total thickness of the memory layer T is preferably smaller than or equal to 60 nm in the vertical 3D-OTP.

Figure 8:
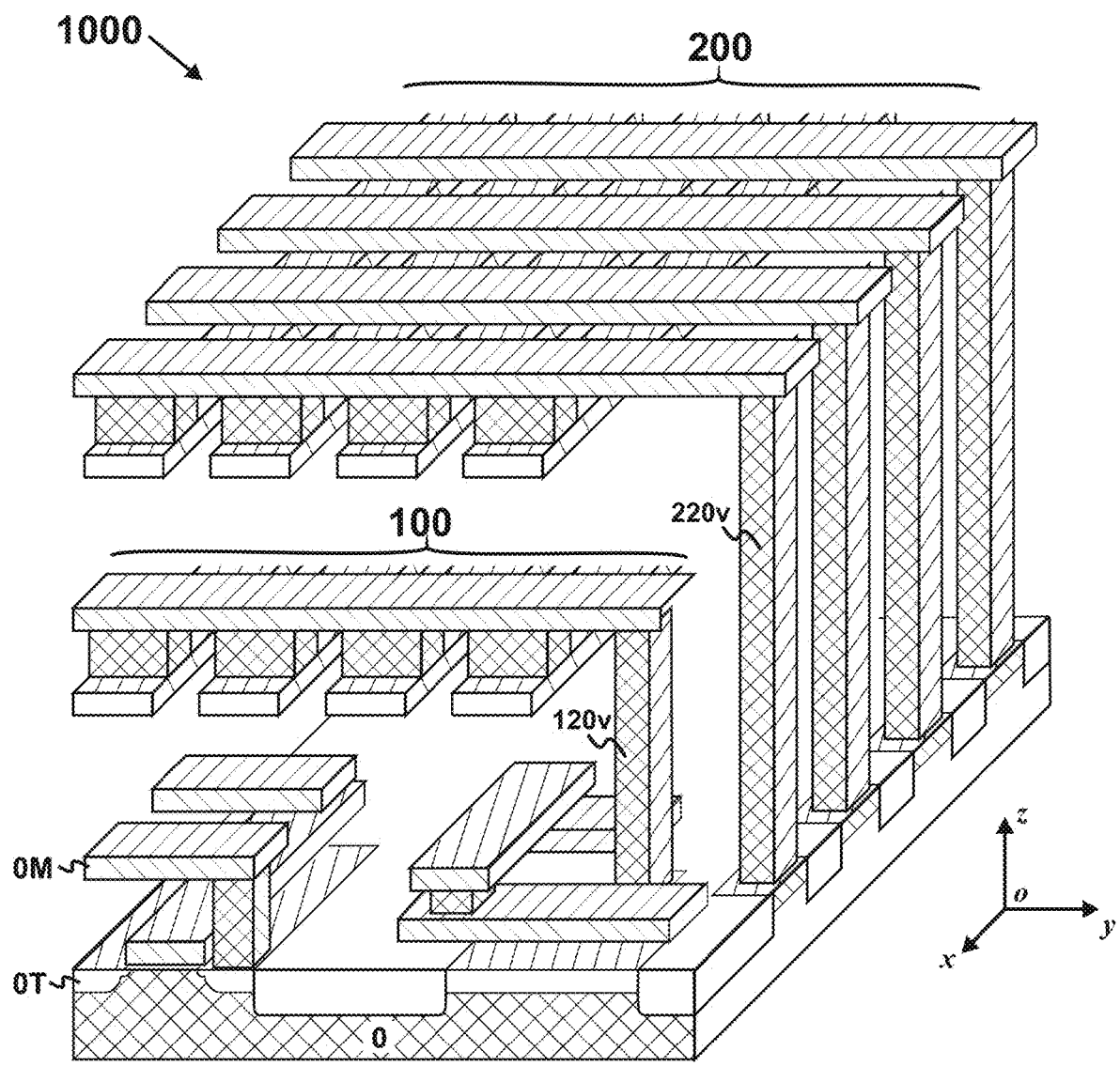
FIG. 8 is a perspective view of a horizontal 3D-OTP.

FIG. 8 discloses a horizontal 3D-OTP 1000. It comprises a semiconductor substrate 0 (including transistors 0t and interconnects 0m). The first memory level 100 is stacked on the substrate 0, and the second memory level 200 is stacked on the first memory level 100. The address lines are electrically coupled with the substrate 0 through the contact vias 120v, 220v. For mass storage, the width of the address lines F is smaller than or equal to 60 nm. For details of the horizontal 3D-OTP, refer to U.S. Pat. No. 5,835,396. The memory device OX of the horizontal 3D-OTP is also referred to as the horizontal device.

FIGS. 9-10 disclose a preferred vertical 3D-OTP 1000 and its vertical device OY. As illustrated in FIG. 9, the vertical OTP device OY comprises a first address line (horizontal address line) 10. The memory hole 40 penetrates the first address line 10. A memory layer 30 is then formed on the side wall of the memory hole 40. After that, a conductive material is filled in the memory hole 40 to form a second address line (vertical address line) 20. Accordingly, the memory layer 30 is formed between the first address line 10 and the second address line 20. In order to achieve a large storage density, the size of the memory hole needs to be small. Namely, the total thickness of the memory layer T is preferably smaller than or equal to 60 nm in the vertical 3D-OTP.

As one preferred embodiment, the memory layer 30 comprises an OTS film 30A and an antifuse film 30B. Similar to FIG. 4C or FIG. 4D, a barrier film (e.g. intermediate-barrier film and/or interface-barrier film) may also be disposed in the memory hole 40. As another preferred embodiment, the memory layer 30 comprises an OTS film 30A, but does not comprise any standalone antifuse film. The OTS film 30A has a first switch voltage (forming voltage $V_{form}$) greater than all subsequent switch voltages (threshold voltage $V_{th}$). Similar to FIG. 4D, a barrier film may also be disposed in the memory hole 40.

As illustrated in FIG. 10, the preferred vertical 3D-OTP 1000 comprises a semiconductor substrate 0 (including transistors and interconnects). A plurality of first address lines (horizontal address lines) 10*a*-10*h* are vertically stacked on the substrate 0 and further on each other. These first address lines 10*a*-10*h* are separated by an insulating dielectric films 50. The memory holes 40 penetrate the first address lines 10*a*-10*h*. A memory layer 30 is then formed on the side wall of each memory hole 40. After that, the second address lines (vertical address lines) 20 are formed by filling conductive material into the memory holes 40. As a result, the vertical devices 0Ya-0Yh are formed at the intersections of the first address lines 10*a*-10*h* and the second address lines 20. These vertical devices 0Ya-0Yh constitute a memory string 16Z. Compared with 3D-NAND, the memory hole 40 of the vertical 3D-OTP 1000 comprises only two layers: a memory layer 30 and a vertical address line 20. In general, the vertical 3D-OTP 1000 has a simple device structure, improved scalability and manufacturability.

While illustrative embodiments have been shown and described, it would be apparent to those skilled in the art that many more modifications than that have been mentioned above are possible without departing from the inventive concepts set forth therein. The invention, therefore, is not to be limited except in the spirit of the appended claims.

What is claimed is:
1. A three-dimensional memory, comprising:
a semiconductor substrate;
a plurality of first and second address lines above said semiconductor substrate, wherein said first and second address lines intersect each other; and,
a plurality of one-time-programmable memory (OTP) devices disposed at the intersections between said first and second address lines;
each of said devices comprising a memory layer between said first and second address lines, wherein said memory layer comprises at least an OTS film, and the total thickness of said memory layer is smaller than or equal to 60 nm.

2. The memory according to claim 1, wherein said memory layer further comprises an antifuse film.

3. The memory according to claim 1, wherein said OTS film has a first switch voltage (forming voltage $V_{form}$) greater than all subsequent switch voltages (threshold voltage $V_{th}$).

4. The memory according to claim 1, wherein said OTS film comprises at least a chalcogenide material.

5. The memory according to claim 1, wherein said first and second address lines are both horizontal address lines, with width smaller than or equal to 60 nm.

6. The memory according to claim 1, further comprising memory holes penetrating said first address lines, wherein:
   said memory layer is formed on the side wall of said memory holes; and,
   said second address lines are disposed in said memory holes and surrounded by said memory layer.

7. The memory according to claim 1, wherein said OTS film is the only active film in said memory layer.

8. The memory according to claim 1, wherein said memory layer does not comprises any active film other than said OTS film.

9. The memory according to claim 2, wherein said memory layer further comprises an intermediate-barrier film between said OTS film and said antifuse film.

10. The memory according to claim 1, wherein said memory layer further comprises a first interface-barrier film between said OTS film and said first/second address lines.

11. The memory according to claim 2, wherein said memory layer further comprises a second interface-barrier film between said antifuse film and said first/second address lines.

* * * * *